US012767353B2

(12) United States Patent
Kishida et al.

(10) Patent No.: US 12,767,353 B2
(45) Date of Patent: Oct. 20, 2026

(54) MANUFACTURING METHOD AND MaaS PROVIDING METHOD

(71) Applicant: TOYOTA JIDOSHA KABUSHIKI KAISHA, Toyota (JP)

(72) Inventors: Kei Kishida, Nisshin (JP); Takehiro Yamada, Nagoya (JP); Hiroaki Yoshitomi, Toyota (JP); Kazuhiko Terai, Nagoya (JP); Koichiro Hayashi, Anjo (JP); Tsuyoshi Okada, Nagoya (JP); Shotaro Suzuki, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/976,588

(22) Filed: Dec. 11, 2024

(65) Prior Publication Data

US 2025/0289589 A1 Sep. 18, 2025

(30) Foreign Application Priority Data

Mar. 12, 2024 (JP) ................................ 2024-038348

(51) Int. Cl.
*B64F 5/10* (2017.01)
*B64F 5/50* (2017.01)

(52) U.S. Cl.
CPC . *B64F 5/10* (2017.01); *B64F 5/50* (2017.01)

(58) Field of Classification Search
CPC .................................... B64F 5/10; B64F 5/50
See application file for complete search history.

(56) References Cited

U.S. PATENT DOCUMENTS

| | | | | |
|---|---|---|---|---|
| 2,383,225 | A * | 8/1945 | Sorensen | B64F 5/10 29/430 |
| 11,807,397 | B2 * | 11/2023 | Anderson | B64F 5/10 |
| 2022/0153441 | A1 | 5/2022 | Smith et al. | |

FOREIGN PATENT DOCUMENTS

| | | |
|---|---|---|
| JP | 2022-081433 A | 5/2022 |

* cited by examiner

*Primary Examiner* — Nirvana Deonauth
(74) *Attorney, Agent, or Firm* — SoraIP, Inc.

(57) ABSTRACT

A manufacturing method includes moving a vehicle that has been transported from outside of a factory by loading a component to be attached to a body of an aircraft onto a carrier to a location where the installation height of the body and the installation height of the component as loaded on the carrier match in an assembly line of the factory, and directly attaching the component from the carrier to the body at a location.

5 Claims, 4 Drawing Sheets

MANUFACTURING METHOD AND MaaS PROVIDING METHOD

CROSS-REFERENCE TO RELATED APPLICATION

This application claims priority to Japanese Patent Application No. 2024-038348 filed on Mar. 12, 2024, incorporated herein by reference in its entirety.

BACKGROUND

1. Technical Field

The present disclosure relates to a manufacturing method and a mobility-as-a-service (MaaS) providing method.

2. Description of Related Art

Japanese Unexamined Patent Application Publication No. 2022-081433 (JP 2022-081433 A) discloses an assembling line for a factory of a flight vehicle.

SUMMARY

Since conventional factories require a large space to assemble the flight vehicle, the location is a problem.

It is an object of the present disclosure to save a space in an assembling area for a flight vehicle.

A manufacturing method according to the present disclosure includes: moving a vehicle transported from an outside of a factory while loading a component to be attached to a body of a flight vehicle on a carrier to a place where an installation height of the body and an installation height of the component loaded on the carrier match each other in an assembling line of the factory; and attaching the component directly to the body from the carrier at the place.

According to the present disclosure, it is possible to assemble the flight vehicle without securing a wide land.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
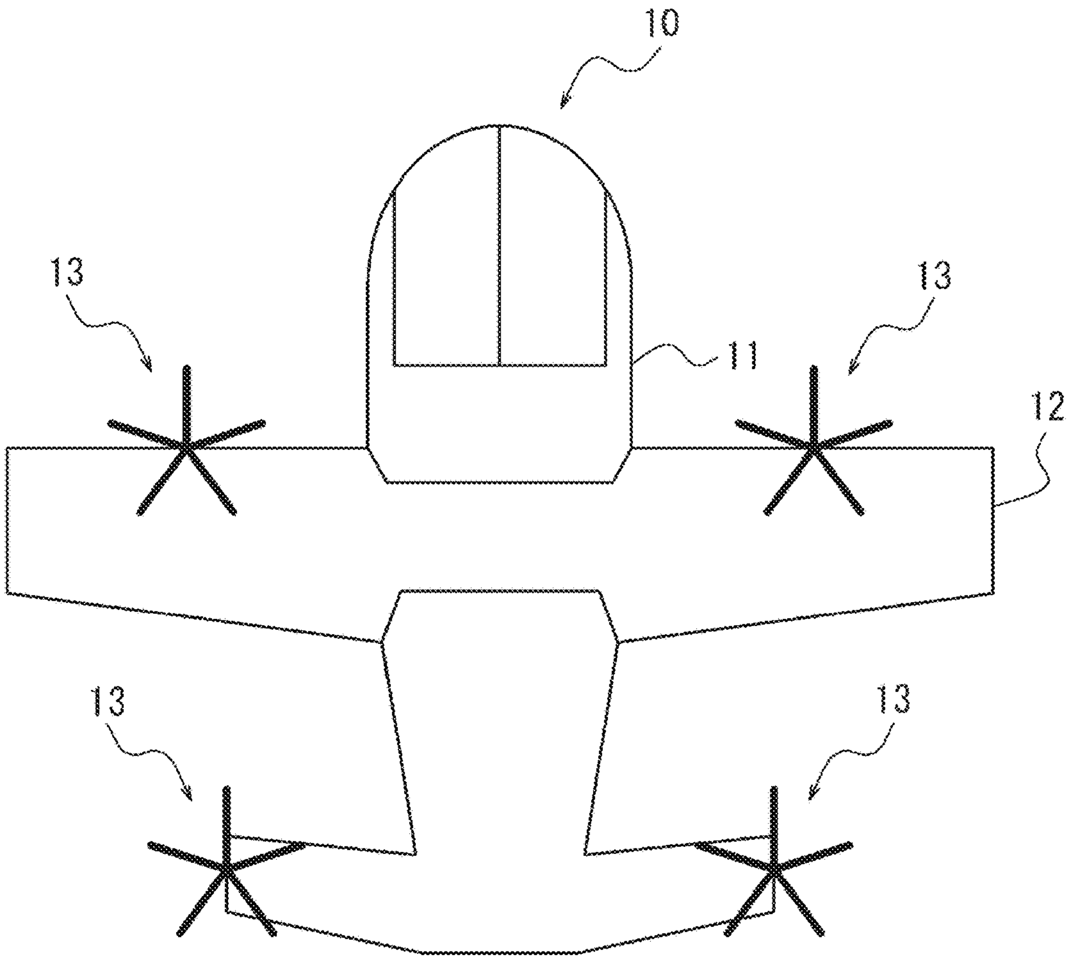
FIG. 1 is a schematic plan view of an aircraft according to an embodiment of the present disclosure.
Figure 2:
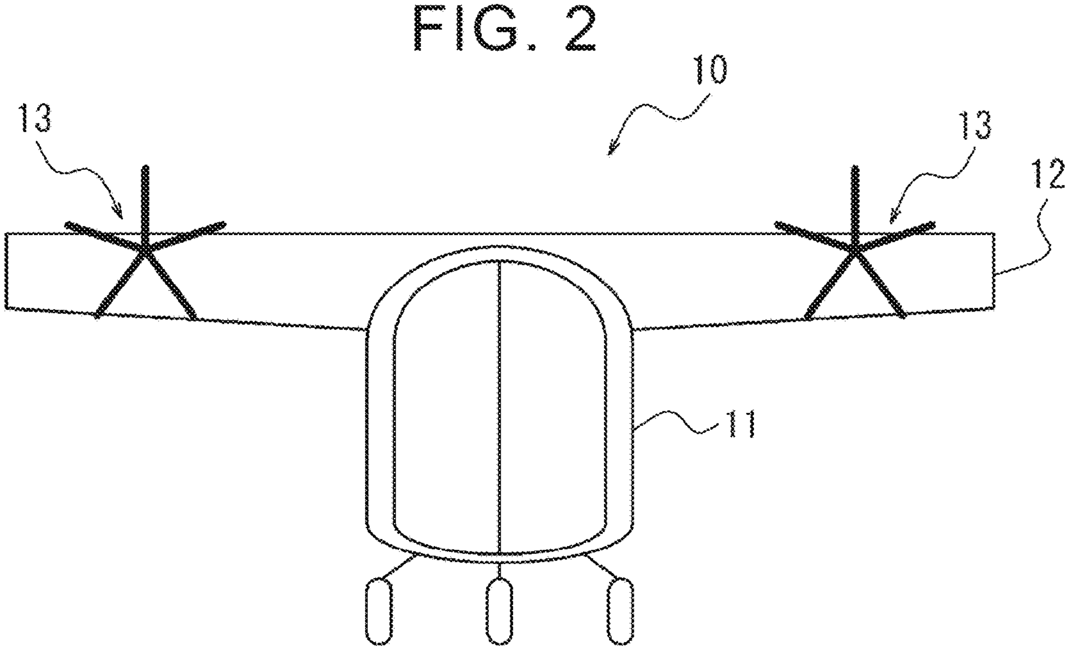
FIG. 2 is a schematic front view of an aircraft according to an embodiment of the present disclosure.

A configuration of the aerial vehicle 10 according to the present embodiment will be described with reference to FIGS. 1 and 2.

The aerial vehicle 10, in this embodiment, is a vertical take-off and landing machine, a so-called eVTOL, that obtains lift and thrust by one or more electric rotors, but may be other types of aerial vehicles, such as an airplane, a helicopter, or a glider. "eVTOL" is an abbreviation for electric vertical take-off and landing (Electric Vertical Take-off and Landing Machine). One or more passengers can board the cabin of the aerial vehicle 10. The aerial vehicle 10 is at least partially steered by VFR. "VFR" is an abbreviation for visual flight rules. The aerial vehicle 10 may be steered by an IFR. "IFR" is an abbreviation for instrument flight rules.

The aerial vehicle 10 includes a main body 11, a main wing 12, and one or more rotor blades 13. The main wing 12 is attached to an upper portion of the main body 11. In addition to the main wing 12, various components such as a door, a seat, and a wheel are attached to the main body 11. The main wing 12 and the tail provided at the rear of the main body 11 each have one or more nacelles. Each nacelle is fitted with a rotor blade 13 and a drive mechanism including a motor for driving the rotor blade 13. The rotor blade 13 corresponds to an electric rotor. The rotor blade 13 may be of a tilt type. The number of rotor blades 13 may be any number as long as it is sufficient to obtain the required thrust, but in the present embodiment, a total of four rotors, two for the main wing 12 and two for the tail wing. The number of nacelles is also the same as the number of rotor blades 13. The main wing 12 incorporates one or more batteries that supply power to the drive mechanism. One or more nacelles may also contain a similar battery. The aerial vehicle 10 may further include equipment such as avionics and actuators, electrical components such as wire harnesses, and outfitting components such as air conditioning ducts and other plumbing, as well as known ones. Avionics include, for example, a computer, a flight recorder and a radar.

In one embodiment, the aerial vehicle 10 may be used to provide MaaS, which is a mobility-based service. The term "MaaS" is an abbreviation for "mobility as a service".

A manufacturing method according to the present embodiment will be described with reference to FIGS. 3 and 4.

Figure 3:
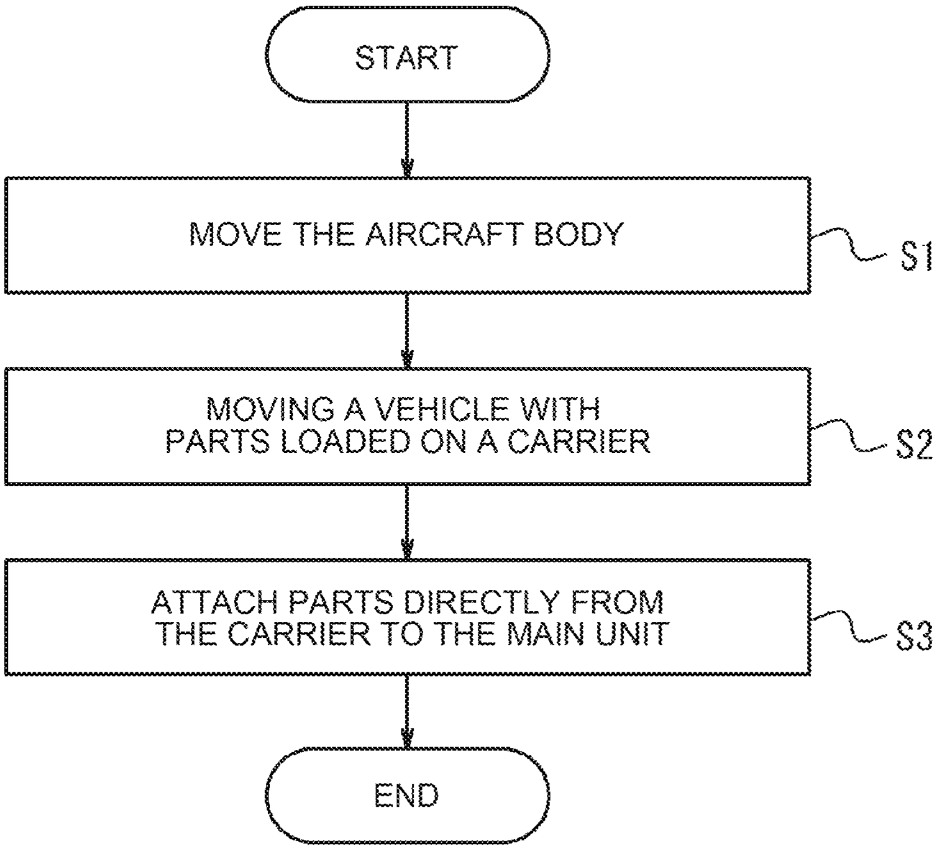
FIG. 3 is a flowchart illustrating a manufacturing method according to an embodiment of the present disclosure.
Figure 4:
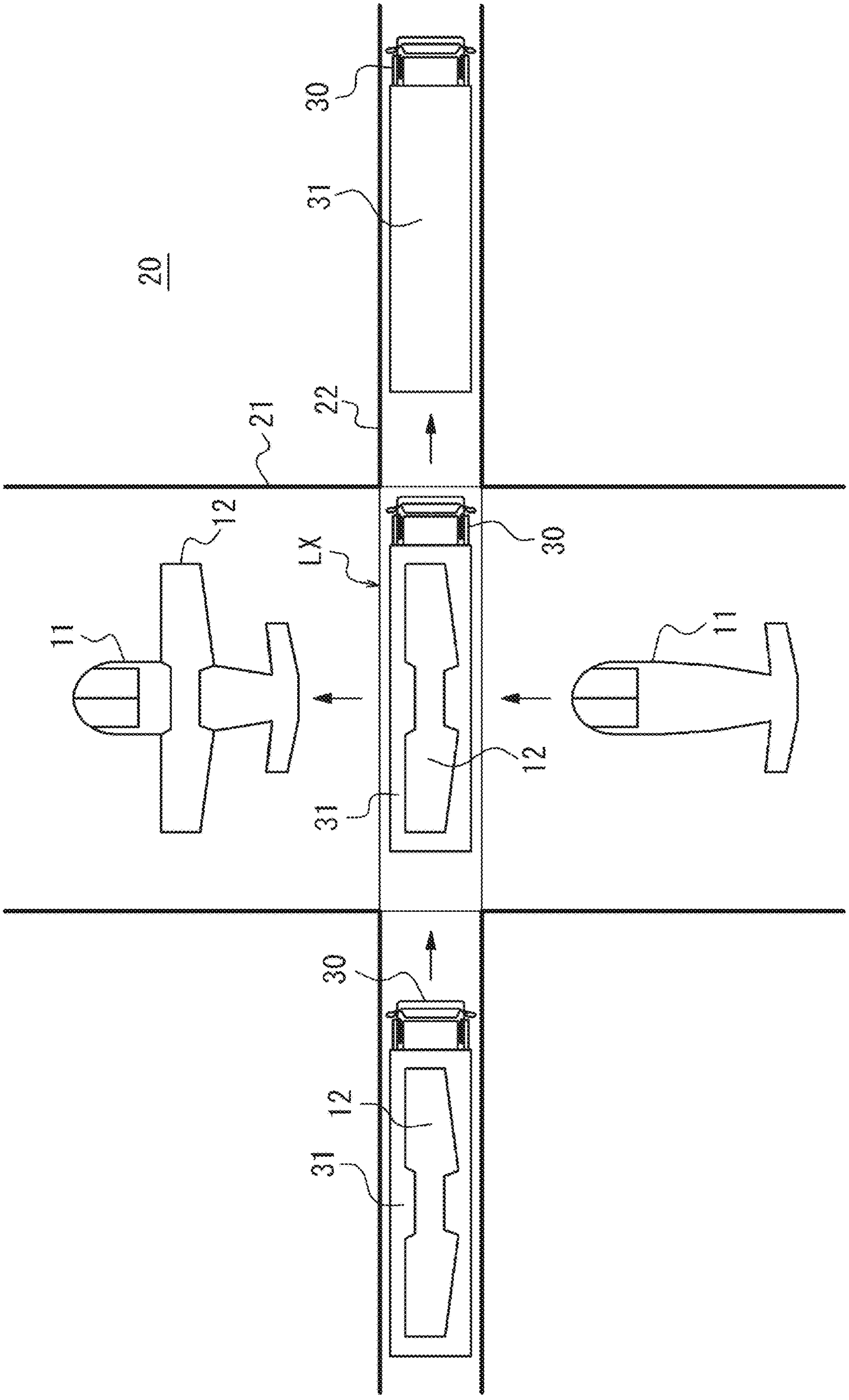
FIG. 4 is a diagram illustrating a factory assembly line and a transport path according to an embodiment of the present disclosure.

The manufacturing method according to the present embodiment includes the steps of S3 from S1 shown in FIG. 3.

S1 steps are started after the body 11 of the aerial vehicle 10 is assembled.

In S1, the body 11 is moved to the location LX. In S2, the vehicles 30 that have been loaded with components such as the main wing 12 attached to the main body 11 on the carrier 31 and transported from outside the factory 20 are moved to the location LX. The vehicle 30 is, for example, a truck. In S3, components such as the main wing 12 are directly attached to the body 11 from the carrier 31 at location LX.

The location LX is a location where the installation height of the main body 11 matches the installation height of the component such as the main wing 12, which remains loaded on the carrier 31, in the assembly line 21 of the factory 20. In the present embodiment, the location LX is a position where the assembly line 21 intersects with the conveyance path 22 extending perpendicular to the assembly line 21 and the periphery thereof.

As a first example, in S1, the conveyor of the assembly line 21 transports the main body 11 to the location LX to move the main body 11 to the location LX. In S2, the driver drives the vehicle 30 along the conveyance path 22, and stops the vehicle 30 while the vehicle 30 passes through the assembly line 21 in a direction perpendicular to the assembly line 21, thereby moving the vehicle 30 to the location LX. Alternatively, if the vehicle 30 is AV, moving the conveyance path 22 autonomously, by stopping itself on the way that the vehicle 30 passes through the assembly line 21 in a direction perpendicular to the assembly line 21, it may be moved to its own location LX. The term "AV" is an abbreviation for autonomous vehicle.

In the first instance, the conveyor of the assembly line 21 has a height that, at location LX, matches the installation height of the main body 11 to the installation height of the component, such as the main wing 12, which remains loaded on the carrier 31. Therefore, when the main body 11 and the vehicle 30 reach the location LX, the installation height of the main body 11 matches the installation height of the component such as the main wing 12 that remains loaded on the carrier 31 at the location LX. Consequently, in S3, components such as the main wing 12 can be directly attached to the main body 11 from the carrier 31 without unloading them from the carrier 31 at the location LX.

For example, assume that the floor of the location LX is flat. At the location LX, the installation height of the main body 11 is H1+H2 when the dimension from the floor surface of the location LX to the upper surface of the conveyor of the assembly line 21 is H1 and the dimension from the upper surface of the conveyor to the joining surface of the upper portion of the main body 11 when the main body 11 is placed on the conveyor is H2. At the location LX, the installation height of the main wing 12 that remains loaded on the carrier 31 becomes H3+H4 when the dimension from the floor surface of the location LX to the upper surface of the carrier 31 of the vehicle 30 is H3 and the dimension from the upper surface of the carrier 31 to the joining surface of the lower portion of the main wing 12 when the main wing 12 is loaded on the carrier 31 is H4. Therefore, the height of the conveyor is adjusted so as to be H1=H3+H4−H2. The conveyor is divided into one side and the other side of the conveyance path 22. In S1, the main body 11 is conveyed to the location LX by a conveyor on one side of the conveyance path 22. In S2, the vehicles 30 stop between a conveyor on one side of the conveyance path 22 and a conveyor on the other side of the conveyance path 22. In S3, the main wing 12 is riveted to the top of the body 11. The main wing 12 is preferably positioned at a joint position when the vehicle 30 is stopped at a location LX in S2, but may be lowered to the joint position by fine-tuning the height of the fixture securing the main wing 12 to the carrier 31 by S3. After S3, the main body 11 to which the main wing 12 is attached is transferred from the conveyor on one side of the conveyance path 22 to the carrier 31, and is further transferred from the top of the carrier 31 to the conveyor on the other side of the conveyance path 22. Alternatively, in S2, the main body 11 is transferred from the conveyor on one side of the conveyance path 22 to the carrier 31, and in S3, the main wing 12 is attached to the main body 11 on the carrier 31. Thereafter, the main body 11 to which the main wing 12 is attached may be transferred from the top of the carrier 31 to the conveyor on the other side of the conveyance path 22.

As a second example, in S1, the main body 11 self-propels to the location LX to move itself to the location LX. In S2, as in the first embodiment, the driver may move the vehicle 30 to the location LX, or the vehicle 30 may move itself to the location LX.

In the second embodiment, the floor of the assembly line 21 is at a location LX such that the installation height of the main body 11 corresponds to the installation height of the component, such as the main wing 12, which remains loaded on the carrier 31. Therefore, as in the first embodiment, when the main body 11 and the vehicle 30 reach the location LX, the installation height of the main body 11 matches the installation height of the component such as the main wing 12 that remains loaded on the carrier 31 at the location LX. Consequently, in S3, components such as the main wing 12 can be directly attached to the main body 11 from the carrier 31 without unloading them from the carrier 31 at the location LX.

For example, at the location LX, the floor on both sides of the conveyance path 22 is higher than the floor of the conveyance path 22, and the elevated part is assumed to be the floor of the assembly line 21. When the dimension from the floor surface of the conveyance path 22 to the floor surface of the assembly line 21 is H5 and the dimension from the floor surface of the assembly line 21 to the joining surface of the upper part of the main body 11 is H6, the installation height of the main body 11 is H5+H6 at the location LX. Assuming that the dimension from the floor surface of the conveyance path 22 to the upper surface of the carrier 31 of the vehicle 30 is H7, and the dimension from the upper surface of the carrier 31 to the joining surface of the lower portion of the main wing 12 when the main wing 12 is loaded on the carrier 31 is H4, the installation height of the main wing 12 that remains loaded on the carrier 31 is H7+H4 at the location LX. Therefore, the height of the step between the floor of the assembly line 21 and the floor of the conveyance path 22 is adjusted so as to be H5=H7+H4−H6. In S1, the main body 11 self-propels to the location LX on one side of the conveyance path 22. In S2, the vehicles 30 stop at a position where there is a step on both sides of the conveyance path 22. In S3, the main wing 12 is riveted to the top of the body 11. The main wing 12 is preferably positioned at a joint position when the vehicle 30 is stopped at a location LX in S2, but may be lowered to the joint position by fine-tuning the height of the fixture securing the main wing 12 to the carrier 31 by S3. After S3, the main body 11 to which the main wing 12 is attached moves from one side of the conveyance path 22 to the top of the carrier 31, and further moves from the top of the carrier 31 to the other side of the conveyance path 22. Alternatively, the main body 11 may be moved from one side of the conveyance path 22 onto the carrier 31 by S2, and in S3, the main wing 12 may be attached to the main body 11 on the carrier 31, and then the main body 11 to which the main wing 12 is attached may be moved from the top of the carrier 31 to the other side of the conveyance path 22.

Figure 5:
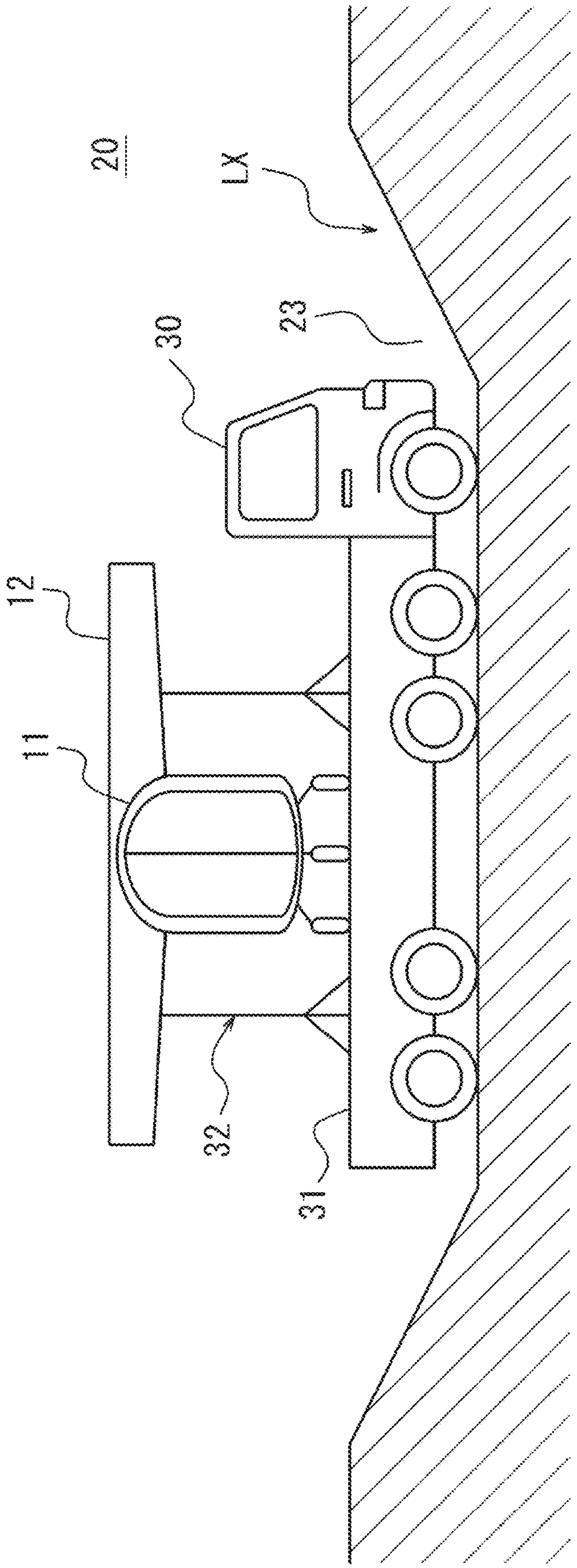
FIG. 5 is a diagram illustrating an example of a location where an installation height of a main body of an aerial vehicle matches an installation height of a component that remains loaded on a carrier of a vehicle in a factory assembly line according to an embodiment of the present disclosure.

As illustrated in FIG. 5, the location LX may be provided with a recess 23 for stopping the vehicles 30. The depth of the recess 23 is such that the installation height of the main body 11 matches the installation height of a component such as the main wing 12 while being stacked on the carrier 31. For example, the recess 23 is provided in the middle of the conveyance path 22 so that the installation height of the main body 11 matches the installation height of the component such as the main wing 12 while being loaded on the carrier 31 at the location LX.

As shown in FIG. 5, when the main body 11 is moved to the carrier 31 and a component such as the main wing 12 placed on the lifter 32 is attached to the main body 11, a column for jacking up the vehicle 30 may be protruded from the floor of the recess 23 in order to prevent the vehicle 30 from sinking. Instead of providing the recesses 23, similar posts may also emerge if, as in the first example, the conveyor of the assembly line 21 is provided high or, as in the second example, the floor of the assembly line 21 is provided high.

After S3, the rotor blade 13 and other components are attached to the main body 11 to which components such as the main wing 12 are attached, and the aerial vehicle 10 is completed. For example, another vehicle carrying the rotor blade 13 may be inserted under the main wing 12 attached to the main body 11, and the rotor blade 13 may be directly attached to the main wing 12 from the vehicle.

In one embodiment, the process of manufacturing the aerial vehicle 10 by the above-described manufacturing method and operating the pilot-based on-demand air taxi service may be performed in providing a service (MaaS) using the aerial vehicle 10. In this case, the service management method according to the above-described procedure is an exemplary method of providing a service (MaaS) using the aerial vehicle 10.

As described above, in the present embodiment, the installation height of the main body 11 of the aerial vehicle 10 in the assembly line 21 of the factory 20 is matched with the installation height of the components in the carrier 31 of the vehicle 30 that carries the components attached to the main body 11 of the aerial vehicle 10 from outside the factory 20. This allows the vehicle 30 to be moved to a location in the factory 20 where the assembly line 21 is located to directly attach components from the carrier 31 to the body 11. Therefore, according to the present embodiment, it is not necessary to store the components transported from the outside of the factory 20 in the storage. That is, it is possible to realize storage-less. As a result, the assembly area of the aerial vehicle 10 can be reduced in space.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A manufacturing method comprising:

loading a component on a carrier of a vehicle, the component being configured to be attached to a body of a flight vehicle;

moving the vehicle from an outside of a factory to an assembly location of the factory;

stopping the vehicle at a recess provided at the assembly location, the recess having a depth at which, when the vehicle is stopped in the recess, an installation height of the body matches an installation height of the component loaded on the carrier of the vehicle; and attaching the component directly to the body from the carrier at the assembly location.

2. The manufacturing method according to claim 1, further comprising transporting the body to the assembly location by a conveyor of an assembly line, wherein the conveyor at the assembly location is at a height at which the installation height of the body matches the installation height of the component loaded on the carrier.

3. The manufacturing method according to claim 1, further comprising causing the body to perform self driving to the assembly location.

4. The manufacturing method according to claim 2, wherein the vehicle is stopped at the recess while the vehicle is passing through the assembly line in a direction orthogonal to the assembly line.

5. The manufacturing method according to claim 4, further comprising transferring the body from the conveyor to a top of the carrier of the vehicle; and attaching the component to the body on the carrier.

* * * * *